US011263105B2

(12) United States Patent
Ellsworth et al.

(10) Patent No.: US 11,263,105 B2
(45) Date of Patent: Mar. 1, 2022

(54) VISUALIZATION TOOL FOR COMPONENTS WITHIN A CLOUD INFRASTRUCTURE

(71) Applicant: Lucid Software, Inc., South Jordan, UT (US)

(72) Inventors: Kevin Ellsworth, South Jordan, UT (US); Austin Row, South Jordan, UT (US); Jonathan Bronson, South Jordan, UT (US); Ruturaj Eksambekar, South Jordan, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

(21) Appl. No.: 16/696,998

(22) Filed: Nov. 26, 2019

(65) Prior Publication Data
US 2021/0157703 A1 May 27, 2021

(51) Int. Cl.
*G06F 11/32* (2006.01)
*G06F 11/30* (2006.01)

(52) U.S. Cl.
CPC ........ *G06F 11/323* (2013.01); *G06F 11/3006* (2013.01); *G06F 11/3075* (2013.01)

(58) Field of Classification Search
None
See application file for complete search history.

(56) References Cited

U.S. PATENT DOCUMENTS

| 5,414,809 | A | 5/1995 | Hogan |
| 6,636,250 | B1 | 10/2003 | Gasser |
| 6,982,708 | B1 | 1/2006 | Mah et al. |
| 7,149,975 | B1 | 12/2006 | Johnson et al. |
| 7,800,613 | B2 | 9/2010 | Hanrahan et al. |

(Continued)

FOREIGN PATENT DOCUMENTS

| JP | 2004-252539 A | 9/2004 |
| JP | 2006-526840 | 11/2006 |

(Continued)

OTHER PUBLICATIONS

International Search Report and Written Opinion issued in PCT Application No. PCT/US2020/018343, dated Jun. 23, 2020.

(Continued)

*Primary Examiner* — Qing Chen
(74) *Attorney, Agent, or Firm* — Maschoff Brennan

(57) ABSTRACT

A method may include obtaining at least one dataset that includes information corresponding to periods of usage of a plurality of components within a cloud infrastructure and usage cost for each component of the plurality of components within the cloud infrastructure. The method may include comparing the information corresponding to the periods of usage with at least a portion of the information corresponding to the usage cost for components. The method may include determining a cost for one or more of the components for a period of time. The cost may be determined based on the comparison of the information corresponding to the periods of usage of the components with at least the portion of the information corresponding to the usage cost for the components. The method may include generating a visualization that includes information representative of the cost of the components and displaying the visualization via a display screen.

11 Claims, 8 Drawing Sheets

(56) References Cited

U.S. PATENT DOCUMENTS

| | | | |
|---|---|---|---|
| 8,364,820 B2 | 1/2013 | Madani et al. | |
| 8,375,068 B1* | 2/2013 | Platt | G06Q 30/06 |
| | | | 707/805 |
| 8,694,906 B2 | 4/2014 | Cole et al. | |
| 8,788,931 B1 | 7/2014 | Chen et al. | |
| 9,201,558 B1 | 12/2015 | Dingman et al. | |
| 9,619,827 B1* | 4/2017 | Joneja | G06Q 30/0284 |
| 9,633,076 B1 | 4/2017 | Morton | |
| 9,684,761 B1 | 6/2017 | Lamant | |
| 9,922,108 B1 | 3/2018 | Meiklejohn et al. | |
| 10,114,884 B1 | 10/2018 | Valensi et al. | |
| 10,175,854 B2 | 1/2019 | Ramanathan et al. | |
| 10,616,078 B1* | 4/2020 | Thomas | G06F 11/3466 |
| 10,684,998 B2 | 6/2020 | Ardila et al. | |
| 2002/0059183 A1 | 5/2002 | Chen | |
| 2004/0168115 A1 | 8/2004 | Bauernschmidt et al. | |
| 2005/0179684 A1 | 8/2005 | Wallace | |
| 2007/0214179 A1 | 9/2007 | Hoang | |
| 2008/0306985 A1* | 12/2008 | Murray | G06Q 30/0218 |
| 2009/0012885 A1* | 1/2009 | Cahn | G06Q 30/0283 |
| | | | 705/34 |
| 2009/0299920 A1 | 12/2009 | Ferris et al. | |
| 2009/0313576 A1 | 12/2009 | Neumann et al. | |
| 2010/0005386 A1 | 1/2010 | Verma et al. | |
| 2010/0153340 A1 | 6/2010 | Yasrebi | |
| 2011/0016099 A1 | 1/2011 | Peer et al. | |
| 2011/0055034 A1* | 3/2011 | Ferris | G06Q 30/0601 |
| | | | 705/26.1 |
| 2011/0055756 A1 | 3/2011 | Chen et al. | |
| 2011/0078171 A1 | 3/2011 | Wagenblatt et al. | |
| 2011/0109472 A1* | 5/2011 | Spirakis | H02J 13/00001 |
| | | | 340/870.02 |
| 2011/0179370 A1 | 7/2011 | Cardno et al. | |
| 2011/0239164 A1 | 9/2011 | Saraiya et al. | |
| 2011/0261049 A1 | 10/2011 | Cardno et al. | |
| 2011/0295865 A1 | 12/2011 | Carroll et al. | |
| 2011/0295999 A1* | 12/2011 | Ferris | G06F 9/5072 |
| | | | 709/224 |
| 2012/0226808 A1* | 9/2012 | Morgan | G06Q 30/04 |
| | | | 709/226 |
| 2012/0290348 A1* | 11/2012 | Hackett | G06Q 10/06315 |
| | | | 705/7.13 |
| 2013/0031143 A1 | 1/2013 | Kityar | |
| 2013/0097544 A1 | 4/2013 | Parker et al. | |
| 2013/0232452 A1 | 9/2013 | Krajec et al. | |
| 2013/0304925 A1* | 11/2013 | Ferris | H04L 47/70 |
| | | | 709/226 |
| 2014/0006421 A1 | 1/2014 | Van Ham | |
| 2014/0071138 A1 | 3/2014 | Gibson et al. | |
| 2014/0181718 A1 | 6/2014 | Gao et al. | |
| 2014/0195515 A1 | 7/2014 | Baker et al. | |
| 2014/0208215 A1* | 7/2014 | Deshpande | G06Q 10/00 |
| | | | 715/736 |
| 2014/0258446 A1* | 9/2014 | Bursell | H04L 41/0816 |
| | | | 709/217 |
| 2014/0278808 A1 | 9/2014 | Lyoob et al. | |
| 2014/0324710 A1 | 10/2014 | Thibout et al. | |
| 2014/0365655 A1* | 12/2014 | Takahashi | H04L 67/10 |
| | | | 709/225 |
| 2015/0019301 A1* | 1/2015 | Jung | G06Q 10/06393 |
| | | | 705/7.39 |
| 2015/0019569 A1 | 1/2015 | Parker et al. | |
| 2015/0201005 A1* | 7/2015 | Corbett | H04L 67/34 |
| | | | 709/217 |
| 2015/0294488 A1 | 10/2015 | Iwasaki et al. | |
| 2015/0312421 A1* | 10/2015 | Leemet | H04W 4/70 |
| | | | 379/114.03 |
| 2015/0339379 A1 | 11/2015 | Inagaki | |
| 2015/0365299 A1 | 12/2015 | Schaerges et al. | |
| 2016/0034835 A1* | 2/2016 | Levi | H04L 67/10 |
| | | | 705/7.23 |
| 2016/0042252 A1 | 2/2016 | Sawhney et al. | |
| 2016/0042253 A1 | 2/2016 | Sawhney et al. | |
| 2016/0070451 A1 | 3/2016 | Kim et al. | |
| 2016/0070541 A1 | 3/2016 | Lee | |
| 2016/0112277 A1 | 4/2016 | Nagarajan et al. | |
| 2016/0162598 A1 | 6/2016 | Schaerges et al. | |
| 2016/0371312 A1 | 12/2016 | Ben-Aharon et al. | |
| 2017/0031958 A1 | 2/2017 | Miller | |
| 2017/0132300 A1 | 5/2017 | Sekar | |
| 2017/0228447 A1 | 8/2017 | Catania et al. | |
| 2017/0293415 A1 | 10/2017 | Mackinlay et al. | |
| 2017/0302550 A1* | 10/2017 | Leemet | H04L 63/1416 |
| 2017/0351753 A1 | 12/2017 | Dunker et al. | |
| 2018/0039657 A1 | 2/2018 | Pandit | |
| 2018/0067998 A1 | 3/2018 | Sherman et al. | |
| 2018/0091579 A1 | 3/2018 | Thomas | |
| 2018/0121482 A1 | 5/2018 | Heen et al. | |
| 2018/0150436 A2 | 5/2018 | Ben-Aharon et al. | |
| 2018/0173790 A1 | 6/2018 | Krishnamacharya | |
| 2018/0189330 A1 | 7/2018 | Doan et al. | |
| 2018/0196863 A1 | 7/2018 | Meiklejohn et al. | |
| 2018/0232340 A1 | 8/2018 | Lee | |
| 2018/0337794 A1* | 11/2018 | Casaletto | H04L 43/0876 |
| 2019/0012736 A1 | 1/2019 | Courbage et al. | |
| 2019/0018904 A1 | 1/2019 | Russell et al. | |
| 2019/0129968 A1 | 5/2019 | Neylan et al. | |
| 2019/0213099 A1* | 7/2019 | Schmidt | G06F 9/5083 |
| 2019/0286620 A1 | 9/2019 | Al-Haimi et al. | |
| 2019/0294473 A1* | 9/2019 | Martin | H04L 43/0817 |
| 2019/0340038 A1* | 11/2019 | Molloy | H04L 43/0876 |
| 2019/0384836 A1 | 12/2019 | Roth et al. | |
| 2020/0004865 A1 | 1/2020 | Dilts et al. | |
| 2020/0004866 A1 | 1/2020 | Dilts et al. | |
| 2020/0004872 A1 | 1/2020 | Dilts et al. | |
| 2020/0192710 A1* | 6/2020 | Kumar | G06F 9/505 |

FOREIGN PATENT DOCUMENTS

| | | |
|---|---|---|
| JP | 2016-085761 A | 5/2016 |
| KR | 10-2015-0031502 | 3/2015 |
| WO | 2012-118726 A2 | 9/2012 |
| WO | 2018/145112 | 8/2014 |

OTHER PUBLICATIONS

International Search Report and Written Opinion issued in PCT Application No. PCT/US2020/036239, dated Sep. 11, 2020.

Office Action issued in U.S. Appl. No. 16/697,004, dated May 7, 2020.

Office Action issued in U.S. Appl. No. 16/024,544, dated Jun. 23, 2020.

Office Action issued in U.S. Appl. No. 16/024,533, dated Jul. 2, 2020.

Office Action issued in U.S. Appl. No. 16/024,551, dated Aug. 10, 2020.

PCT/US2018/017105 International Search Report and Written Opinion, dated Apr. 6, 2018 (22 pgs).

International Search Report and Written Opinion issued in PCT Application No. PCT/US2019/040001, dated Oct. 24, 2019.

International Search Report and Written Opinion issued in PCT Application No. PCT/US2019/040004, dated Oct. 24, 2019.

International Search Report and Written Opinion issued in PCT Application No. PCT/US2019/040006, dated Oct. 24, 2019.

Office Action issued in U.S. Appl. No. 16/024,533, dated Mar. 18, 2020.

Office Action issued in U.S. Appl. No. 16/024,551, dated Apr. 2, 2020.

How to Use ViewModel in Asp. Net MVC with Example, by Tutlane, archived on Archive.org on Oct. 26, 2017. https://web.archive.org/web/20171026085504/https://www.tutlane.conn/tutorial/aspnet-nnvc/how-to-use-viewnnodel-in-asp-net-nnvc-with-example. (Year: 2017).

Single asp.net MVC application using multiple databases, by Adriano Silva, StackOverflow, Mar. 22, 2012, https://stackoverflow.conn/questions/9823330/single-asp-net-nnvc-application-using-multiple-databases. (Year: 2012).

Refresh table using AJAX in asp.net MVC, by Voila Daniel, StackOverflow, Jul. 28, 2016, https://stackoverflow.com/questions/38635966/refresh-table-using-ajax-in-asp-net-mvc. (Year: 2016).

(56) References Cited

OTHER PUBLICATIONS

Upload and Read CSV File in asp.net MVC, by TechBrij, Jan. 17, 2015, https://techbrij.com/read-csv-asp-net-mvc-file-upload. (Year: 2015).

PCT International Search Report and Written Opinion issued in corresponding application No. PCT/US2020/062438, dated Mar. 23, 2021.

PCT International Search Report and Written Opinion issued in corresponding application No. PCT/US2020/062437, dated Mar. 19, 2021.

Notice of Allowance issued in corresponding U.S. Appl. No. 16/024,533, dated Oct. 20, 2020.

Notice of Allowance issued in corresponding U.S. Appl. No. 16/024,544, dated Sep. 30, 2020.

Office Action issued in corresponding U.S. Appl. No. 16/445,040, dated Feb. 19, 2021.

Office Action issued in corresponding U.S. Appl. No. 16/024,551, dated Jan. 14, 2021.

Office Action issued in corresponding U.S. Appl. No. 16/697,004, dated Oct. 26, 2020.

Non-Final Office Action issued in corresponding U.S. Appl. No. 16/697,004, dated Mar. 31, 2021.

Notice of Allowance issued in corresponding U.S. Appl. No. 16/445,040, dated May 27, 2021.

Final Office Action issued in corresponding U.S. Appl. No. 16/024,551, dated May 12, 2021.

* cited by examiner

VISUALIZATION TOOL FOR COMPONENTS WITHIN A CLOUD INFRASTRUCTURE

FIELD

The embodiments discussed in the present disclosure are related to a visualization tool for components within a cloud infrastructure.

BACKGROUND

Unless otherwise indicated in the present disclosure, the materials described in the present disclosure are not prior art to the claims in the present application and are not admitted to be prior art by inclusion in this section.

A cloud infrastructure may include components that are used for cloud computing activities. A cloud service provider may charge fees for use of components within the cloud infrastructure. The fees may be determined based on usage of the components for cloud computing activities associated with a user during a period of time.

The subject matter claimed in the present disclosure is not limited to implementations that solve any disadvantages or that operate only in environments such as those described above. Rather, this background is only provided to illustrate one example technology area where some implementations described in the present disclosure may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described in the present disclosure generally relate to a visualization tool for components within a cloud infrastructure.

In an example embodiment, a method may include obtaining at least one dataset. The at least one dataset may include information corresponding to periods of usage of a plurality of components within a cloud infrastructure. The at least one dataset may also include information corresponding to usage cost for each component of the plurality of components within the cloud infrastructure. In addition, the method may include comparing the information corresponding to the periods of usage of the components within the cloud infrastructure with at least a portion of the information corresponding to the usage cost for each component within the cloud infrastructure. Further, the method may include determining a cost for one or more of the components within the cloud infrastructure for a period of time. The cost for each component may be determined based on the comparison of the information corresponding to the periods of usage of the components within the cloud infrastructure with at least the portion of the information corresponding to the usage cost for each component of the plurality of components within the cloud infrastructure. The method may include generating a visualization. The visualization may include information representative of the cost of one or more of the components within the cloud infrastructure for the period of time. The method may also include displaying the visualization. The visualization may be displayed via a display screen.

In another example embodiment, a non-transitory computer-readable storage medium has computer-executable instructions stored thereon that are executable by a processor device to perform or control performance of operations that may include obtaining at least one dataset. The at least one dataset may include information corresponding to periods of usage of a plurality of components within a cloud infrastructure. The at least one dataset may also include information corresponding to usage cost for each component of the plurality of components within the cloud infrastructure. In addition, the operations may include comparing the information corresponding to the periods of usage of the components within the cloud infrastructure with at least a portion of the information corresponding to the usage cost for each component within the cloud infrastructure. Further, the operations may include determining a cost for one or more of the components within the cloud infrastructure for a period of time. The operations may include generating a visualization. The visualization may include information representative of the cost of one or more of the components within the cloud infrastructure for the period of time. The operations may also include displaying the visualization. The visualization may be displayed via a display screen.

In yet another example embodiment, a system including a processor configured to cause performance of operations that may include obtaining at least one dataset. The at least one dataset may include information corresponding to periods of usage of a plurality of components within a cloud infrastructure. The at least one dataset may also include information corresponding to usage cost for each component of the plurality of components within the cloud infrastructure. In addition, the operations may include comparing the information corresponding to the periods of usage of the components within the cloud infrastructure with at least a portion of the information corresponding to the usage cost for each component within the cloud infrastructure. Further, the operations may include determining a cost for one or more of the components within the cloud infrastructure for a period of time. The operations may include generating a visualization. The visualization may include information representative of the cost of one or more of the components within the cloud infrastructure for the period of time. The operations may also include displaying the visualization. The visualization may be displayed via a display screen.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
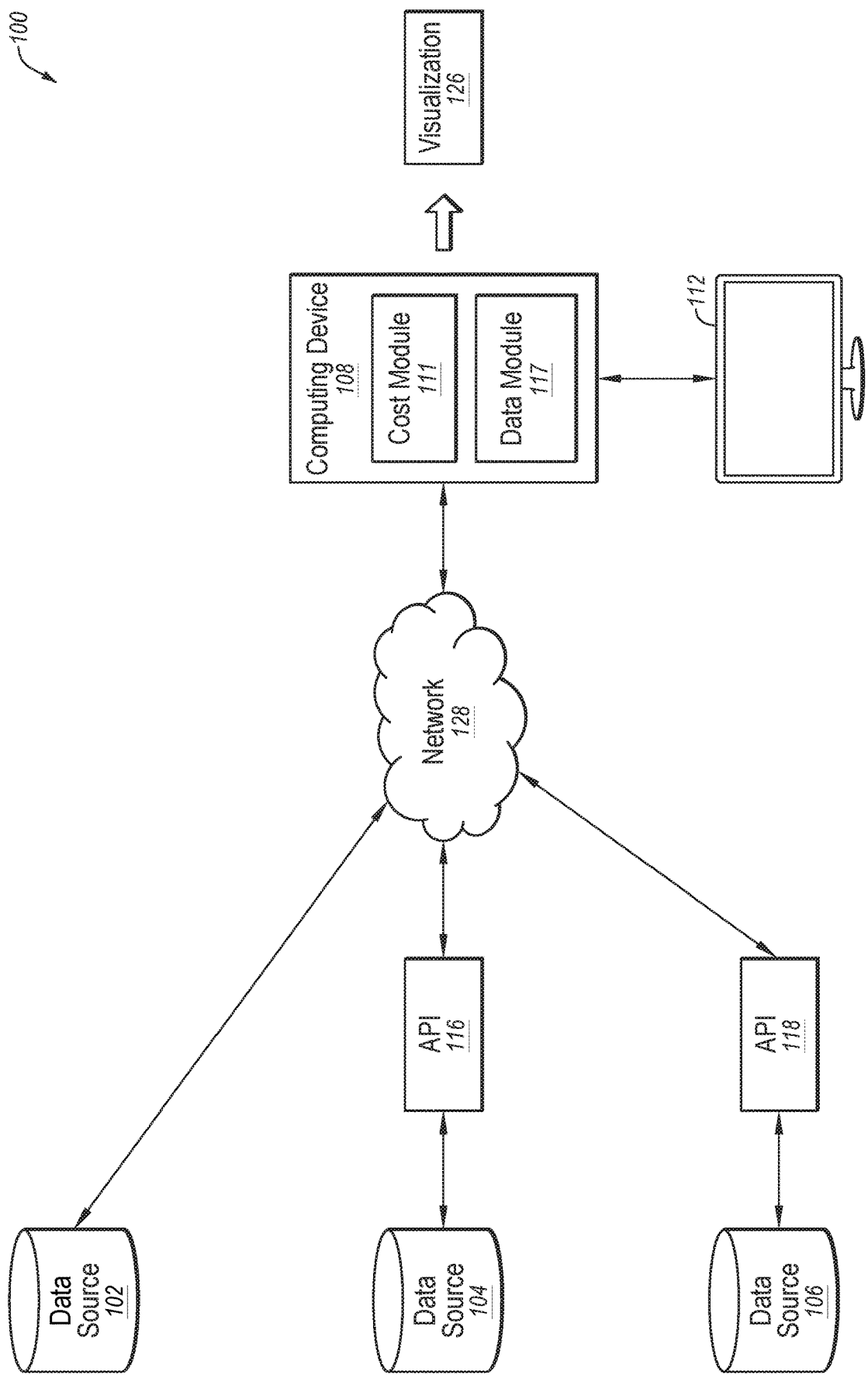
FIG. 1 is a block diagram of an example environment to generate a visualization of a cost of components within a cloud infrastructure.

A cloud infrastructure may include hardware components and software components (generally referred to as "components") for performing cloud computing activities. Example components may include servers, data storage devices, communication networks (e.g., subnets), virtual private clouds (VPCs), and any other appropriate back-end component for implementing the cloud infrastructure.

Cloud service providers may charge fees to a user for use of the components within the cloud infrastructure. The fees may be determined by comparing usage of the components for cloud computing activities associated with the user with a list of prices (e.g., usage costs) of the components within the cloud infrastructure (generally referred to in the present disclosure as "list of prices"). The list of prices may include a list of the components within the cloud infrastructure and corresponding prices for using the components. The cloud service providers may maintain the list of prices.

In some embodiments, the fees may be determined based on usage of the components within a period of time (e.g., a billing period). For example, the fees may be determined based on how many times each component is read (e.g., a number of times each component is used) for the period of time (e.g., a period of a month). As another example, the fees may be determined based on a number of minutes or hours each component is turned on (e.g., used) for cloud computing activities associated with the user within the period of time (e.g., a period of thirty days).

An estimated usage cost or an actual usage cost (generally referred to in the present disclosure as "cost") of components for cloud computing activities associated with the user for the period of time may be determined using the list of prices, a bill corresponding to a previous period of time (generally referred to in the present disclosure as "bill"), an estimated rate of component usage, or some combination thereof.

The bill may include a list of components and information describing the actual usage cost associated with the components for the previous period of time. In some embodiments, the bill may correspond to a period of time that occurred in the past. In these and other embodiments, the bill may be generated by the cloud service provider. The estimated rate of component usage may be provided by the user. The estimated rate of component usage may include information describing how much each component is estimated to be used during the period of time. For example, the estimated rate of component usage may include information describing how much each component is estimated to be used during a month.

Some cloud infrastructure cost technologies may generate a report or the bill so that the report and/or bill only include a table of information comprising alphanumeric characters describing the components and the actual usage cost of the components. The report or the bill may be generated using tags included in the list of prices and/or the bill. In addition, these cloud infrastructure cost technologies may not include options for the user to rearrange the information included in report or the bill to view costs associated with individual components, groupings of components, or different groupings of components.

In addition, some cloud infrastructure cost technologies may not readily provide the list of prices. In these cloud infrastructure cost technologies, the user may access a cloud infrastructure console to obtain the list of prices. The list of prices may be stored in multiple webpages maintained within the cloud infrastructure console. The user may spend lots of time sorting through large amounts of data within the webpages to locate individual prices associated with the components. Further, the prices associated with different types of components may be stored in webpages located in different areas of the cloud infrastructure console, which may cause the user to spend even more time locating and sorting through the information to locate individual prices associated with the components.

According to one or more embodiments described in the present disclosure, a visualization representative of the cost of the components within the cloud infrastructure may be generated. In some embodiments, the list of prices (e.g., a first dataset) may be obtained from the cloud service provider. In other embodiments, the list of prices (e.g., the first dataset) may be obtained from a software as a service (SaaS) provider. In addition, the bill or the estimated rate of component usage (e.g., a second dataset) may be obtained from either the user or from the cloud service provider. In some embodiments, a single dataset may include the information in the first dataset and the second dataset. In other embodiments, the first dataset and the second dataset may be obtained from a single source (e.g., a single data source 102, 104, 106). In some embodiments, the first dataset and the second dataset may be compared and the cost of the components within the cloud infrastructure may be determined. The cost of the components within the cloud infrastructure may be determined for the period of time. The visualization representative of the cost of components within the cloud infrastructure (generally referred to in the present disclosure as "visualization") may be generated. The visualization may include the cost of the components within the cloud infrastructure for the period of time. The visualization may be displayed within a graphical user interface (GUI) via a display screen.

Therefore, in accordance with one or more embodiments described in the present disclosure, the user may more readily discern the price, either estimated usage cost, or actual usage cost of the components using the visualization. In addition, in accordance with one or more embodiments described in the present disclosure, the visualization may be generated without the user providing a tag for each of the components included in the estimated rate of component usage or the bill. Further, in accordance with one or more embodiments described in the present disclosure, the visualization may be generated to include objects and/or information in context of the cloud infrastructure.

In addition, in accordance with at least one or more embodiments described in the present disclosure, the visualization may be alterable based on user input to show the cost of different groupings of the components. Further, in accordance with at one or more embodiments described in the present disclosure, the visualization may be alterable based on user input instead of manipulating the first dataset or the second dataset.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 is a block diagram of an example environment 100 to generate a visualization 126 of a cost of components within a cloud infrastructure, arranged in accordance with at least one embodiment described in the present disclosure. The environment 100 may include one or more data sources 102, 104, 106 and a computing device 108. The operating environment 100 may also include a display screen 112 and a network 128.

The network 128 may include any communication network configured for communication of signals between any of the components (e.g., 102, 104, 106, and 108) of the operating environment 100. The network 128 may be wired or wireless. The network 128 may have numerous configurations including a star configuration, a token ring configuration, or another suitable configuration. Furthermore, the network 128 may include a local area network (LAN), a wide area network (WAN) (e.g., the Internet), and/or other interconnected data paths across which multiple devices may communicate. In some embodiments, the network 128 may include a peer-to-peer network. The network 128 may also be coupled to or include portions of a telecommunications network that may enable communication of data in a variety of different communication protocols.

In some embodiments, the network 128 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 128 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the computing device 108 and the data sources 102, 104, 106.

Each of the data sources 102, 104, 106 may include one or more collections of datasets. In some embodiments, at least a portion of the datasets may include data collections of a corresponding entity, such as a cloud service provider for cloud computing such as Microsoft Azure, Amazon Web Service, Google Cloud, and/or any other cloud service provider. In these and other embodiments, at least a portion of the datasets obtained from the data sources 102, 104, 106 may include data collections corresponding to a user. In some embodiments, the entities corresponding to the data sources 104, 106 may provide application programming interfaces 116, 118 that permit the computing device 108 to obtain the datasets from the data sources 104, 106 via the network 128.

The computing device 108 may include a cost module 111 and a data module 117. The cost module 111 and the data module 117 may be configured to implement steps and processes associated with determining costs of the components and generating the visualization 126.

The cost module 111 may include code and routines configured to enable the computing device 108 to perform one or more operations with respect to generating and presenting the visualization 126. Additionally or alternatively, the cost module 111 may be implemented using hardware including a processor, a microprocessor (e.g., to perform or control performance of one or more operations), a field-programmable gate array (FPGA), or an application-specific integrated circuit (ASIC). In some other instances, the cost module 111 may be implemented using a combination of hardware and software. In the present disclosure, operations described as being performed by the cost module 111 may include operations that the cost module 111 may direct a corresponding system to perform.

The data module 117 may include code and routines configured to enable the computing device 108 to perform one or more operations with respect to generating and presenting the visualization 126. Additionally or alternatively, the data module 117 may be implemented using hardware including a processor, a microprocessor (e.g., to perform or control performance of one or more operations), a field-programmable gate array (FPGA), or an application-specific integrated circuit (ASIC). In some other instances, the data module 117 may be implemented using a combination of hardware and software. In the present disclosure, operations described as being performed by the data module 117 may include operations that the data module 117 may direct a corresponding system to perform.

The data module 117 may obtain the datasets from the data sources 102, 104, 106. In some embodiments, the data module 117 may obtain the first dataset that includes the list of prices of the components. In these and other embodiments, the data module 117 may obtain the first dataset from the data sources 102, 104, 106 that are associated or otherwise maintained by the cloud service provider. In some embodiments, the first dataset may be obtained from the data sources 102, 104, 106 that are associated with the SaaS provider. For example, the SaaS provider may scan the cloud infrastructure and generate a report that includes the list of prices and/or actual usage costs specific to the components within the cloud infrastructure that is included in the first dataset.

In some embodiments, the first dataset may include metadata related to the cloud infrastructure. For example, the metadata may include information describing functionality of the components. In these and other embodiments, the first dataset may be obtained by the data module 117 by gathering information contained within multiple webpages that are maintained by the cloud service provider. For example, the data module 117 may access the cloud infrastructure console via the application programming interfaces 116, 118 and extract the list of prices from the multiple webpages and/or different areas of the cloud infrastructure console.

In some embodiments, the data module 117 may obtain the second dataset that includes information corresponding to periods of usage of the components for the period of time. For example, the second dataset may include the bill. As another example, the second dataset may include information describing the estimated rate of component usage. As yet another example, the second dataset may include information describing actual usage of the components over multiple periods of time. In some embodiments, the second dataset may be obtained from the data sources 102, 104, 106 that are associated with or otherwise maintained by the user. In other embodiments, the second dataset may be obtained from the data sources 102, 104, 106 that are associated or otherwise maintained by the cloud service provider. In some embodiments, the second dataset may be obtained in a comma-separated value (CSV) format.

The cost module 111 may direct display of a request for information from the user via the GUI. The request for information may ask the user whether the visualization 126 is to be representative of the actual usage cost or the estimated usage cost of the components for the period of time. In some embodiments, responsive to a user response being received via the GUI, the cost module 111 may direct the data module 117 to obtain the datasets. For example, responsive to the user response indicating that the visualization 126 is to be representative of the actual usage cost for the period of time, the cost module 111 may direct the data module 117 to obtain the first dataset. In addition, the cost module 111 may direct the data module 117 to obtain the second dataset that includes the bill. As another example, responsive to the user response indicating that the visualization 126 is to be representative of the estimated usage cost for the period of time, the cost module 111 may direct the data module 117 to obtain the first dataset. In addition, the cost module 111 may direct the data module 117 to obtain the second dataset that includes the estimated rate of component usage.

An example of the user response indicating that the visualization 126 is to be representative of the actual usage cost for the period of time will now be discussed. The cost module 111 may compare the first dataset and the second dataset. In some embodiments, the cost module 111 may compare the list of prices corresponding to the usage cost for each component in the first dataset with periods of actual usage of the components within the period of time in the second dataset.

In some embodiments, the cost module 111 may extract the usage cost for components that were actually used during the period of time. For example, the cost module 111 may extract a cost per minute, cost per use, any other appropriate range of use from the first dataset. In addition, in some embodiments, the cost module 111 may extract information describing the component type, component specifications, or any other appropriate information from the first dataset.

In some embodiments, the cost module 111 may extract actual usage of the components during the period of time from the second dataset. For example, the cost module 111 may extract how many times the components were accessed for the user during the period of time, a number of minutes or hours that the components were turned on for the user during the period of time, or any other appropriate information regarding actual usage of the components during the period of time. In addition, in some embodiments, the cost module 111 may extract information describing when the components were used during the period of time, why the components were used during the period of time, what type of activities the components were used for during the period of time, or any other appropriate information from the second dataset.

In addition, in some embodiments, the cost module 111 may determine the actual usage cost for the components for the period of time by comparing the list of prices corresponding to the usage cost for each component extracted from the first dataset with the estimated rate of component usage for each component extracted from the second dataset. For example, the cost module 111 may compare a cost of a particular component extracted from the first dataset to the estimated rate of component usage for the particular component extracted from the second dataset. In these and other embodiments, the cost module 111 may perform one or more mathematical functions using the extracted information. For example, the cost module 111 may multiply the number of minutes a particular component was actually used during the period of time by the cost per minute for using the component.

The cost module 111 may generate the visualization 126. In some embodiments, the cost module 111 may generate the visualization 126 to be representative of the actual usage costs of the components for the period of time. In these and other embodiments, the visualization 126 may include information describing the actual usage cost for the period of time, periods of usage during the period of time, or any other appropriate information for the period of time. In addition, in some embodiments, the visualization 126 may include information describing historical usage costs for previous periods of time, historical periods of usage for previous periods of time, or any other appropriate information for the previous periods of time.

In addition, the cost module 111 may direct display of the visualization 126 via the display screen 112. The visualization 126 may be displayed via the GUI and the display screen 112 so as to include the actual usage cost of the components and any other appropriate information extracted from the first dataset and/or the second dataset.

An example of the user response indicating that the visualization 126 is to be representative of the estimated usage cost for the period of time will now be discussed. The cost module 111 may compare the first dataset and the second dataset. In some embodiments, the cost module 111 may compare the list of prices corresponding to the usage cost for each component in the first dataset with the estimated rate of component usage in the second dataset.

In some embodiments, the cost module 111 may extract the usage cost for components that were actually used by the user within the period of time and/or the information describing the component type, component specifications, or any other appropriate information from the first dataset as discussed above.

In some embodiments, the cost module 111 may extract the estimated rate of component usage from the second dataset. For example, the second dataset may be in the CSV format and the user may provide information describing how many times, how many minutes or hours, or any other appropriate information describing how much each component within the cloud infrastructure is estimated to be used during the period of time. In addition, in some embodiments, the cost module 111 may extract information describing when the components are estimated to be used during the period of time, why the components are estimated to be used during the period of time, what type of activities the components are to be estimated to be used for during the period of time, or any other appropriate information from the second dataset.

In some embodiments, the cost module 111 may determine the estimated usage cost for the components for the period of time by comparing the list of prices corresponding to the usage cost for each component extracted from the first dataset with the periods of actual usage of the components within the period of time extracted from the second dataset. For example, the cost module 111 may compare a cost of a particular component extracted from the first dataset to the actual usage rate extracted from the second dataset. In these and other embodiments, the cost module 111 may perform one or more mathematical functions using the extracted information. For example, the cost module 111 may multiply the number of times a component was estimated to be used during the period of time by the cost per use for using the component.

The cost module 111 may generate the visualization 126. In some embodiments, the cost module 111 may generate the visualization 126 to be representative of the estimated usage costs of the components for the period of time. In addition, the cost module 111 may direct display of the visualization 126 via the display screen 112. The visualization 126 may displayed via the GUI and the display screen 112 so as to include the estimated usage cost of the components and any other appropriate information extracted from the first dataset and/or the second dataset.

Additional example processes that may be performed involving the visualization 126 will now be discussed. The example processes are discussed using the general term "visualization 126" for simplicity of discussion. The example processes may be performed using the visualization 126 representative of the actual usage cost or the estimated usage cost of the components for the period of time.

In some embodiments, the visualization 126 may include multiple objects and information. In these and other embodiments, the objects in the visualization 126 may be representative of a different component. Additionally or alternatively, the objects in the visualization 126 may represent multiple components. The visualization 126 may be alterable by the cost module 111 based on user input received via the GUI. In some embodiments, the cost module 111 may determine which objects and/or information are to be hidden or included in the visualization 126 based on the user input. In some embodiments, the objects may be depicted as images of the corresponding components.

In some embodiments, user input may be received via the GUI effective to indicate that one or more objects in the visualization 126 are to be altered. For example, in some embodiments, the visualization 126 may include containers and each object may be positioned within a container. The user input may indicate that one or more objects in the visualization 126 are to be moved to be positioned within different containers. As another example, the user input may indicate one or more objects in the visualization 126 are to include additional information describing the corresponding components.

The cost module 111 may identify any objects and/or information in the visualization 126 corresponding to the objects indicated by the user input that are to be altered. The cost module 111 may move the objects, remove the objects, add information to the objects, remove information from the objects, or any other appropriate action for altering the objects indicated in the user input.

In some embodiments, user input may be received via the GUI effective to select portions of the first dataset and the second dataset to be included or not included in the visualization 126. For example, the user input received via the GUI may be effective to indicate that only selected portions of the first dataset and/or the second dataset are to be included in the visualization 126. As another example, the user input received via the GUI may be effective to indicate that selected portions of the first dataset and/or the second dataset are to be filtered out of (e.g., hidden in) the visualization 126.

In some embodiments, the cost module 111 may identify one or more objects and/or information that are to be included in the visualization 126. In these and other embodiments, a structure of the visualization 126 may be used by the cost module 111 to identify the one or more objects and/or information that are to be included in the visualization 126. In some embodiments, the structure of the visualization 126 may include a default organization and arrangement of the one or more objects and/or information that are to be included in the visualization 126. For example, the default organization and arrangement may be selected by a programmer of the cost module 111. In some embodiments, multiple default organizations and arrangements may be selected by the programmer of the cost module 111. In these and other embodiments, the user may be directed to select a particular organization and arrangement via the GUI. The user input may be effective to select the organization and arrangement to be used by the cost module 111. In other embodiments, the cost module 111 may determine the structure of the visualization 126 based on user input. For example, user input may be received that is effective to select the organization and arrangement of the one or more objects and/or information that are to be included in the visualization 126.

The cost module 111 may include the corresponding objects and/or information and hide other objects and/or information in the visualization 126 based on the structure of the visualization 126. In these and other embodiments, the cost module 111 may identify one or more objects and/or information that are not to be included in the visualization 126. The cost module 111 may filter out the corresponding objects and/or information from the visualization 126. Additionally or alternatively, the visualization 126 may be generated to only include the objects and/or information that are to be included. The visualization 126 may only include information describing the costs corresponding to the objects that are included in the visualization 126.

In some embodiments, user input may be received via the GUI effective to select objects in the visualization 126. The cost module 111 may identify and extract information from the first dataset and/or the second dataset corresponding to the selected objects. The cost module 111 may direct display of the corresponding extracted information via the GUI. For example, the extracted information may identify a corresponding component type, periods of actual or estimated usage, usage cost of the corresponding components, or any other appropriate information regarding the corresponding components.

In some embodiments, user input may be received via the GUI effective to select a function to be performed using only information corresponding to the objects included in the visualization 126. The cost module 111 may identify the function to be performed and the corresponding information. The cost module 111 may perform the function using only the corresponding information. For example, the function to be performed may be add up a total cost of components corresponding to objects within a particular container in the visualization 126. The cost module 111 may determine the total cost for the particular container in the visualization 126.

In some embodiments, user input may be received via the GUI effective to indicate a threshold cost. In addition, the user input may be effective to select a function to be performed by the cost module 111 if the cost of a component or the total cost of a container exceeds, is equal to, or is less than the threshold cost. For example, the user input may indicate that a red circle is to be placed around each object within the visualization 126 that corresponds to components that costs exceed three hundred dollars. The cost module 111 may place the red circle around the corresponding objects, and/or containers within the visualization 126. The red circle or other function results may be alerts regarding the cost of a corresponding component or grouping of components.

The cost module 111 may identify the cost of each component or combination of components within the visualization 126 and perform the function indicated by the user input. For example, the user input may indicate that if the cost associated with a particular component exceeds the threshold cost, the corresponding object is to be highlighted in the visualization 126. As another example, the user input may indicate that if the total cost of a container does not exceed the threshold cost, the corresponding objects and/or the particular container are to be highlighted in the visualization 126.

Therefore, by altering the visualization 126 based on the user input, the visualization 126 may only include costs or information associated with the objects of interest to the user. In some embodiments, altering the visualization 126 based on the user input may permit the user to readily identify high cost components. In these and other embodiments, the user may be able to select specific usage times, components to use, or any other aspect of the cloud infrastructure to reduce the cost associated with the components.

In some embodiments, alterations made to the objects in the visualization 126 may be propagated back to the datasets to update the data sources 102, 104, 106 consistent with the alterations to the objects in the visualization 126. In these and other embodiments, all alterations to the objects in the visualization 126 may be saved locally on the computing device 108 (e.g., while the user is editing the visualization 126). At some point, e.g., when the user is closing the visualization 126, all of the locally saved changes may be presented to the user via the GUI on the display screen 112. The user may, e.g., choose to propagate a given implicated alterations back to the data sources 102, 104, 106 save a given alterations locally without propagating it back to the data sources 102, 104, 106, and/or completely discard a given alterations such that it is neither propagated back to the data sources 102, 104, 106 nor saved in the visualization 126 locally.

Figure 2:
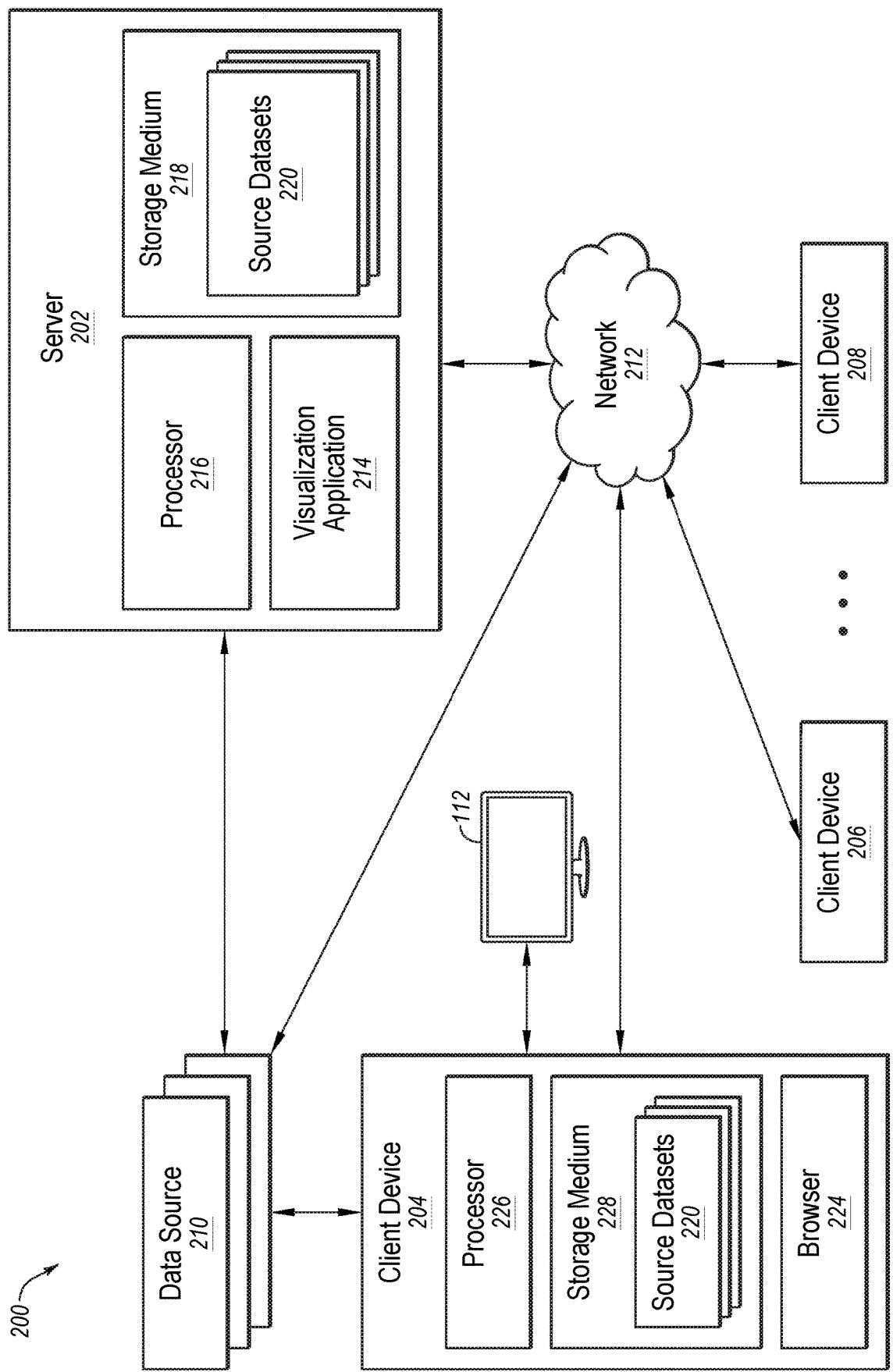
FIG. 2 is a block diagram of an example operating environment in which the computing device of FIG. 1 may be implemented.

FIG. 2 is a block diagram of an example operating environment 200 in which the computing device 108 of FIG. 1 may be implemented, arranged in accordance with at least one embodiment described in the present disclosure.

The operating environment 200 may include a server 202 and one or more client devices 204, 206, 208. The server 202 and/or the client devices 204, 206, 208 may be configured to generate, alter, and/or interact with the visualization of actual usage cost of components within the cloud infrastructure based on datasets from one or more data sources 210. Each of the one or more data sources 210 may include or correspond to the data sources described elsewhere in the present disclosure. Each of the client devices 204, 206, 208 may include or correspond to the computing device 108 of FIG. 1.

Although one server 202 and three client devices 204, 206, 208 are illustrated in FIG. 2, the operating environment 200 may more generally include one or more servers 202 and one or more client devices 204, 206, 208. In these and other embodiments, the operating environment 200 may include other servers and/or devices not illustrated in FIG. 2.

The operating environment 200 may additionally include a network 212. The network 212 may correspond to the network 128 of FIG. 1. In general, the network 212 may include one or more wide area networks (WANs) and/or local area networks (LANs) that enable the server 202, the client devices 204, 206, 208, and the data sources 210 to communicate with each other. In some embodiments, the network 212 may include the Internet, including a global internetwork formed by logical and physical connections between multiple WANs and/or LANs. Alternately or additionally, the network 212 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 212 may also include servers that enable one type of network to interface with another type of network.

In at least one embodiment, the server 202 may host a web-based visualization application ("application 214") that allows the client devices 204, 206, 208 and/or users thereof to generate, alter, and/or interact with the visualization of the cost of components within the cloud infrastructure as described in the present disclosure. The application 214 may correspond to the cost module 111 and/or the data module 117 of FIG. 1. In other embodiments, the application 214 may include a non-web-based application but may generally be described in the present disclosure as a web-based application for simplicity.

The server 202 may additionally include a processor 216 and a storage medium 218. The processor 216 may be of any type such as a CPU, a microprocessor (µP), a microcontroller (µC), a digital signal processor (DSP), or any combination thereof. The processor 216 may be configured to execute computer instructions that, when executed, cause the processor 216 to perform or control performance of one or more of the operations described in the present disclosure with respect to the server 202.

The storage medium 218 may include volatile memory such as random-access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid-state storage device, or other persistent or non-volatile computer storage medium. The storage medium 218 may store computer instructions that may be executed by the processor 216 to perform or control performance of one or more of the operations described in the present disclosure with respect to the server 202.

The storage medium 218 may additionally store datasets 220. The datasets 220 may be obtained from the data sources 210. In at least one embodiment, a single dataset of the datasets 220 may be generated for each of the data sources 210. In at least one embodiment, each of the datasets 220 may be generated for a single data source 210. The datasets 220 may be persistently stored in the storage medium 218 and/or at least temporarily stored in volatile storage, e.g., in-memory.

Each of the client devices 204, 206, 208 may execute an application, such as the browser 224, configured to communicate through the network 212 with the server 202. The browser 224 may include an Internet browser or other suitable application for communicating through the network 212 with the server 202. The browser 224 may generate, download, and/or interact with the visualization. Each of the client devices 204, 206, 208 may include a desktop computer, a laptop computer, a tablet computer, a mobile phone, a smartphone, a personal digital assistant (PDA), a wearable device (e.g., a smart watch), or another suitable client device.

Each of the client devices 204, 206, 208 may additionally include a processor and a storage medium, such as a processor 226 and a storage medium 228 as illustrated for the client device 204 in FIG. 2. Each of the other client devices 206, 208 may be similarly configured. Similar to the processor 216 of the server 202, the processor 226 may be of any type such as a CPU, a µP, a µC, a DSP, or any combination thereof. The processor 226 may be configured to execute computer instructions that, when executed, cause the processor 226 to perform or control performance of one or more of the operations described in the present disclosure with respect to the client device 204 and/or the browser 224.

Similar to the storage medium 218 of the server 202, the storage medium 228 of the client device 204 may include volatile memory such as RAM, persistent or non-volatile storage such as ROM, EEPROM, CD-ROM or other optical disk storage, magnetic disk storage or other magnetic storage device, NAND flash memory or other solid-state storage device, or other persistent or non-volatile computer storage medium. The storage medium 228 may store computer instructions that may be executed by the processor 226 to perform one or more of the operations described in the present disclosure with respect to the client device 204 and/or the browser 224. The storage medium 228 may additionally store, at least temporarily, the datasets 220 from the server 202 and/or created locally on the client device 204.

Embodiments described in the present disclosure are not limited to using a browser to communicate with the server 202 to generate, customize, and/or interact with the visualization of the actual usage cost of a cloud infrastructure. For example, rather than or in addition to a browser, the client devices 204, 206, 208 may include a native app as are often used on client devices 204, 206, 208 such as mobile devices including smartphones and tablet computers. Accordingly, embodiments described in the present disclosure generally include generating, customizing, and/or interacting with the visualization using a browser, a native app, or another suitable application on the client devices 204, 206, 208.

Figure 3:
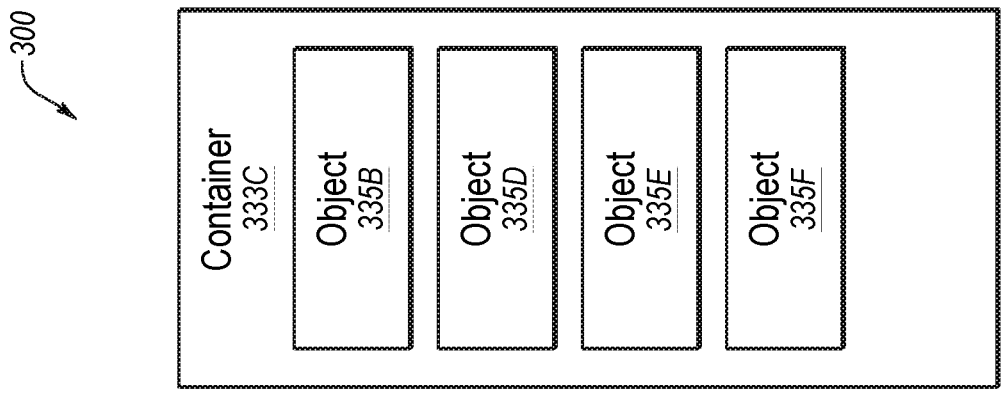
FIG. 3 illustrates an example visualization of the cost of components within the cloud infrastructure.
Figure 3:
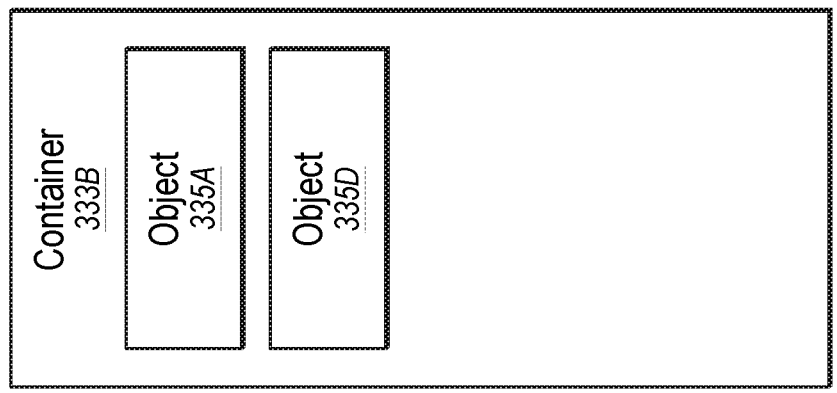
Figure 3:
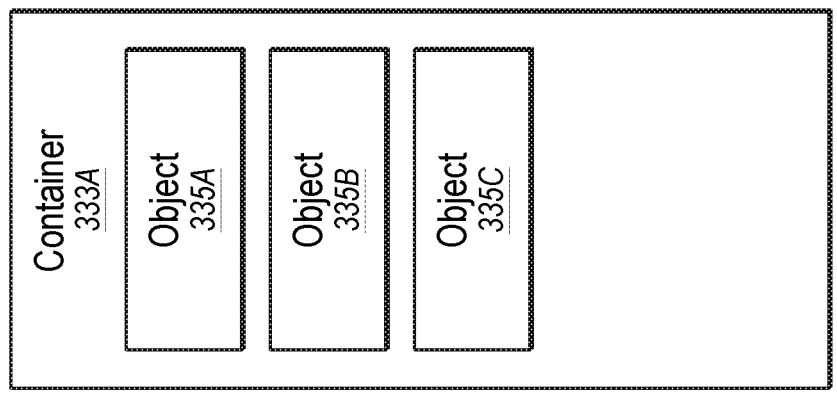

FIG. 3 illustrates an example visualization 300 of the cost of components within the cloud infrastructure, arranged in accordance with at least one embodiment described in the present disclosure. The visualization 300 may correspond to the visualization 126 of FIG. 1. The visualization 300 may include multiple containers 333a-c (collectively referred to in the present disclosure as "containers 333"). Each of the containers 333 may include one or more objects 335a-f (collectively referred to in the present disclosure as "objects 335").

In some embodiments, the containers 333 may represent grouping of components within the cloud infrastructure. In these and other embodiments, the containers 333 may represent regions, VPCs, security rules, or any other appropriate relationship between the objects 335. In other embodiments, the containers 333 may represent components and each of the objects 335 within the containers 333 may represent sub-components. For example, the containers 333 may represent VPCs and each of the objects 335 within the containers 333 may represent availability zones within the different VPCs. As another example, the containers 333 may represent regions and the objects 335 may represent servers available within the regions.

In some embodiments, the containers 333 may include information describing the cost of each of the components corresponding to the objects 335 within the containers 333 for the period of time. In these and other embodiments, the containers 333 may include information describing a total cost for each of the components corresponding to the objects 335 within the containers 333 for the period of time. In some embodiments, the cost or the total cost for each of the components corresponding to the objects 335 within the containers 333 for the period of time may be displayed via an information field included in the GUI as discussed below in relation to FIG. 4.

In some embodiments, the containers 333 may include duplicate objects 335. For example, container 333b and container 333c may both include object 335d representative of the same component in the cloud infrastructure. As another example, container 333a and container 333c may both include object 335a representative of the same component in the cloud infrastructure. The containers 333 that include duplicate objects 335 may include information corresponding to the duplicate objects 335.

Figure 4A:
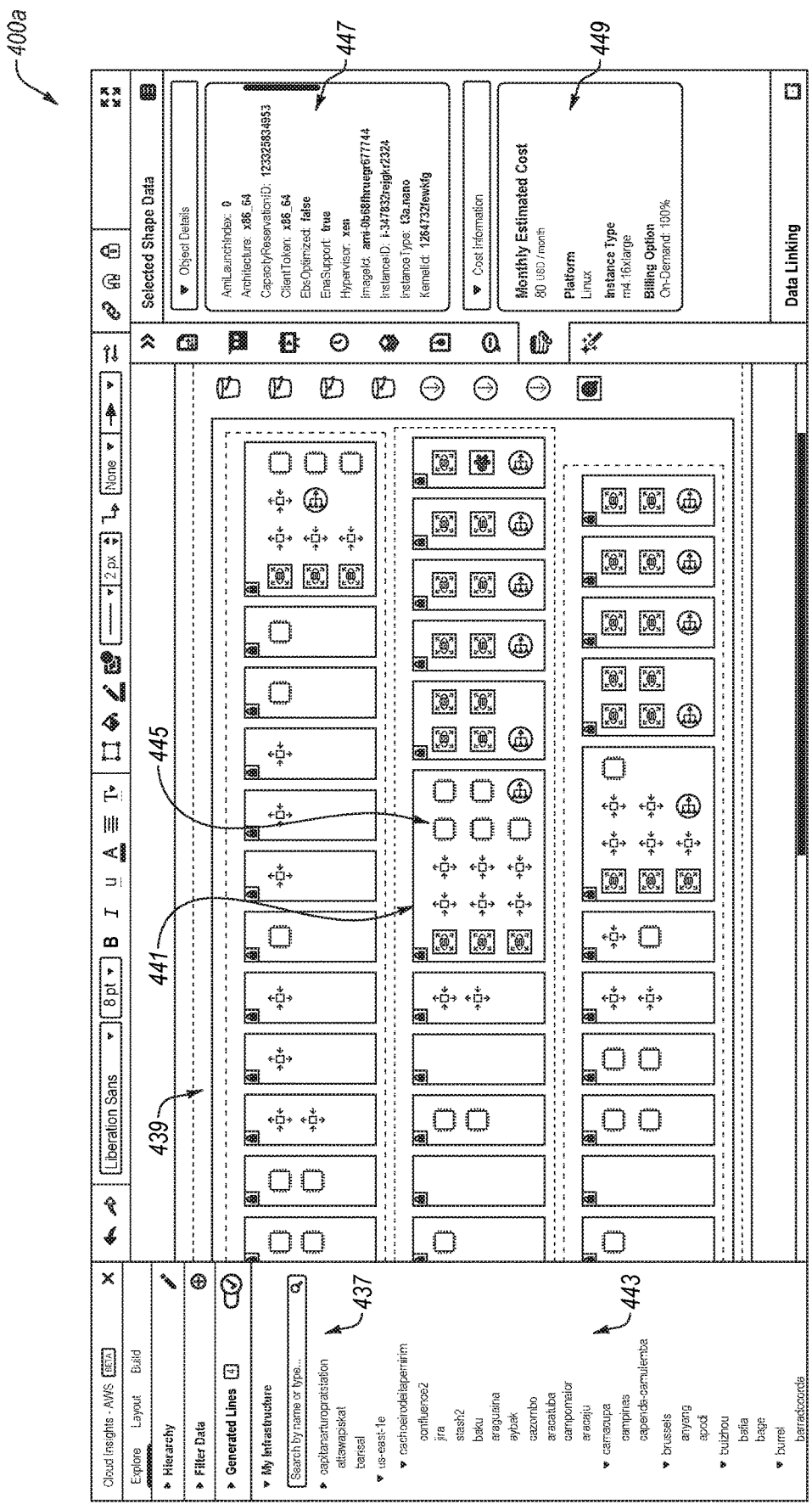
FIG. 4A illustrates a screen shot of an example GUI that may be implemented in the computing device of FIG. 1.
Figure 4B:
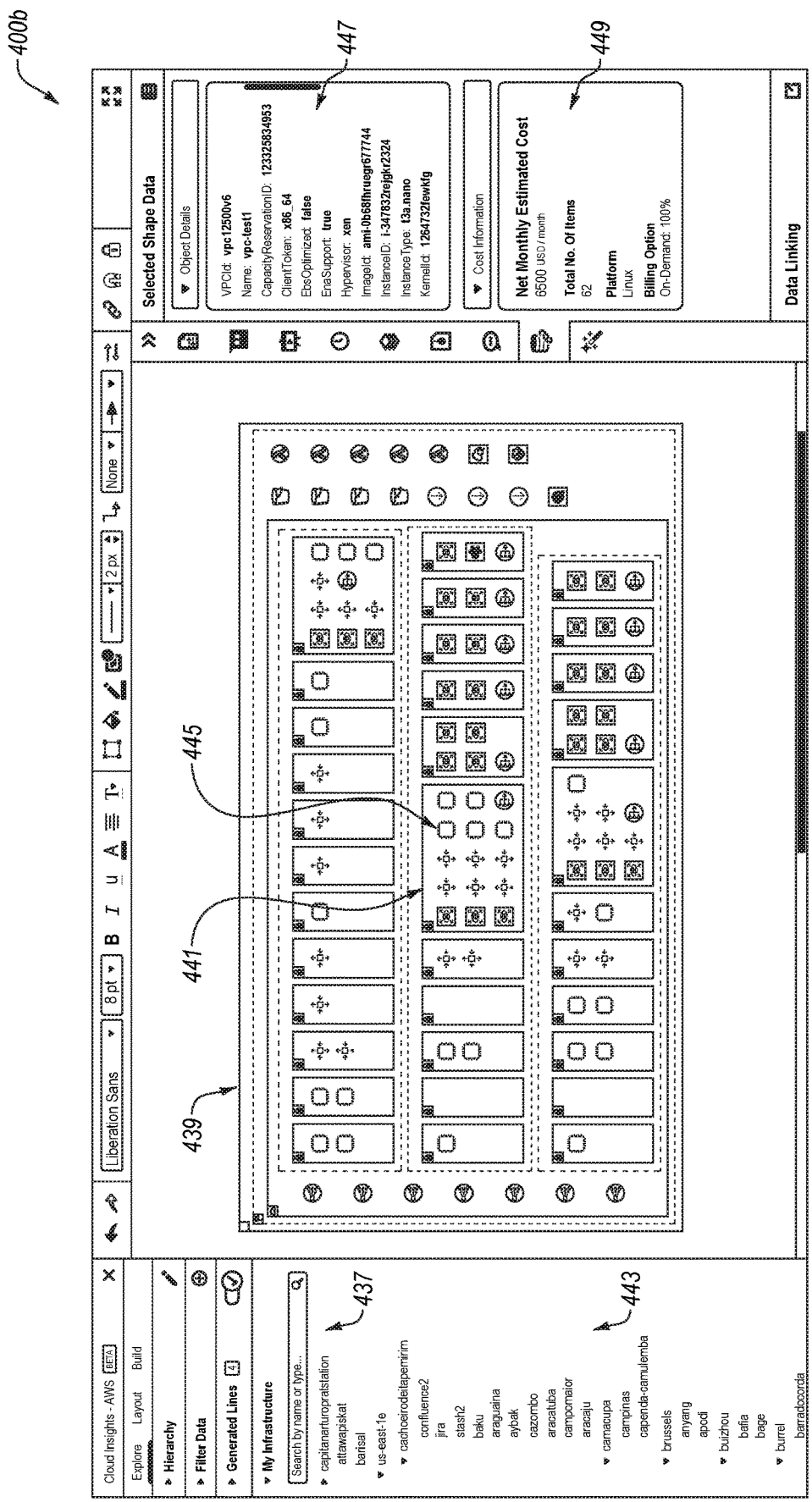
FIG. 4B illustrates another screen shot of the example GUI that may be implemented in the computing device of FIG. 1.

FIGS. 4A and 4B illustrate screen shots 400a and 400b of an example GUI that may be implemented in the computing device 108 of FIG. 1, arranged in accordance with at least one embodiment described in the present disclosure. The screen shots 400a and 400b illustrate an example selection field 443, an example search field 437, an example information field 447, an example visualization 439 of the cost of components within the cloud infrastructure, and an example cost field 449.

The visualization 439 may correspond to the visualization 126 of FIG. 1. With combined reference to FIGS. 4A and 4B, the search field 437 may permit the user to search for particular components within the visualization 439 by an object name associated with the particular components. The selection field 443 may include a hierarchical list of cloud infrastructures that are selectable. The selection field 443 may permit the user to search for cloud infrastructures based on hierarchical organizations. The user may provide user input either via the search field 437 or the selection field 443 effective to select a cloud infrastructure that the visualization 439 is to be representative of. The visualization 439 may include multiple containers 441 that may include one or more objects 445. In FIGS. 4A and 4B, a single container is denoted as 441 to illustrate an example container. In addition, in FIGS. 4A and 4B, a single object is denoted as 445 to illustrate an example object.

With reference to FIG. 4A, the object denoted as 445 is illustrated as an example selected object 445 that has been selected by the user to display additional information and costs associated with a corresponding component. The example information field 447 may include information corresponding to the selected object 445. In some embodiments, the information field 447 may include information describing a client token, image identification (e.g., illustrated as ImageId), instance identification (e.g., illustrated as Instance ID), etc. associated with the selected object 445.

The example cost field 449 may include information describing an associated cost for the component corresponding to the selected object 445. For example, as illustrated in FIG. 4A, a monthly estimated cost of the component corresponding to the selected object 445 is listed as eighty U.S. dollars. The associated cost of the component corresponding to the selected object 445 is illustrated in FIG. 4A as an estimated cost. In some embodiments, the associated cost of the component corresponding to the selected object 445 may be displayed either as the actual usage cost or the estimated usage cost.

With reference to FIG. 4B, the container denoted as 441 is illustrated as an example selected container that has been selected by the user to display additional information and costs associated with corresponding components. The example information field 447 may include information corresponding to the components corresponding to the objects within the selected container 441. In some embodiments, the information field 447 may include information describing a client token, image identification (e.g., illustrated as ImageId), instance identification (e.g., illustrated as Instance ID), etc. associated with the components corresponding to the objects within the selected container 441.

The example cost field 449 may include information describing an associated total cost for the components corresponding to the objects within the selected container 441. For example, as illustrated in FIG. 4B, a net monthly estimated cost (e.g., a total estimated cost for the period of time) for the components corresponding to the objects within the selected container 441 is six thousand five hundred U.S. dollars.

Figure 5:
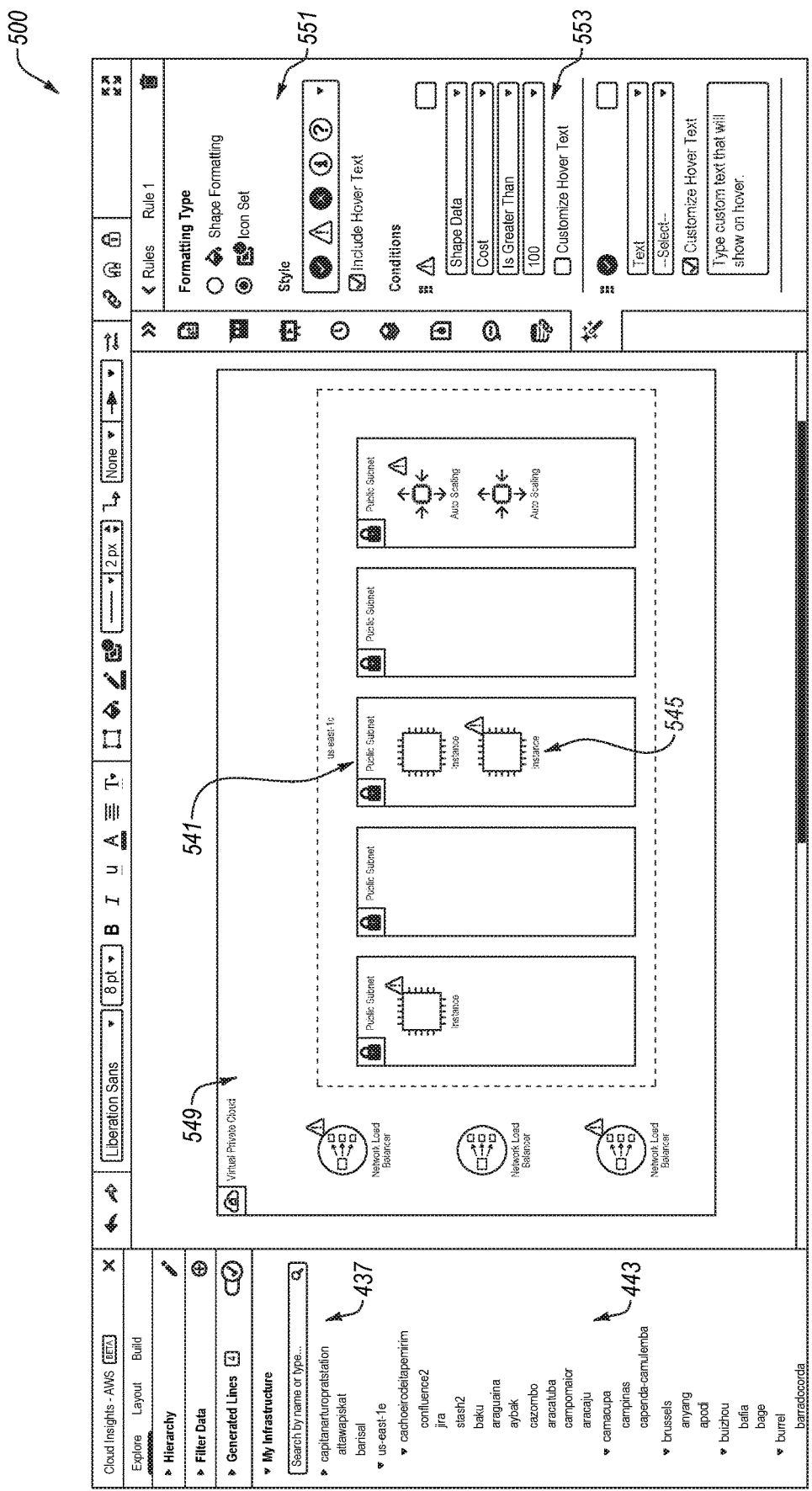
FIG. 5 illustrates a screen shot of an example GUI that may be implemented in the computing device of FIG. 1.

FIG. 5 illustrates a screen shot 500 of an example GUI that may be implemented in the computing device 108 of FIG. 1, arranged in accordance with at least one embodiment described in the present disclosure. The screen shot 500 illustrates example selection fields 551, 553 and an example visualization 549 of the cost of components within the cloud infrastructure. The visualization 549 may correspond to the visualization 126 of FIG. 1.

As illustrated in FIG. 5, the selection field 551 includes multiple selection fields for the user to select aspects of the visualization 549 that are to be edited or a style of alerts that are to be displayed in the visualization. In addition, as illustrated in FIG. 5, the selection field 553 includes multiple drop-down boxes. The drop-down boxes may be configured to pre-populate with alert setting to be selected by the user to for alerts to be included in the visualization 549. The visualization 549 may include multiple containers 541 that may include one or more objects 545. In FIG. 5, a single container is denoted as 541 to illustrate an example container. In addition, in FIG. 5, a single object is denoted as 545 to illustrate an example object.

As illustrated in FIG. 5, the object denoted as 545 is illustrated as being associated with an alert. The associated alert may indicate that the cost associated with the component corresponding to the object 545 exceeds a threshold cost selected by the user using the selection field 553. For example, as illustrated in the example selection field 553 in FIG. 5, the threshold cost may be selected by the user to be one hundred U.S. dollars. In addition, as illustrated in FIG. 5, the alerts displayed in the visualization 549 may include yellow triangles with an exclamation mark in the middle of the triangles.

Figure 6:
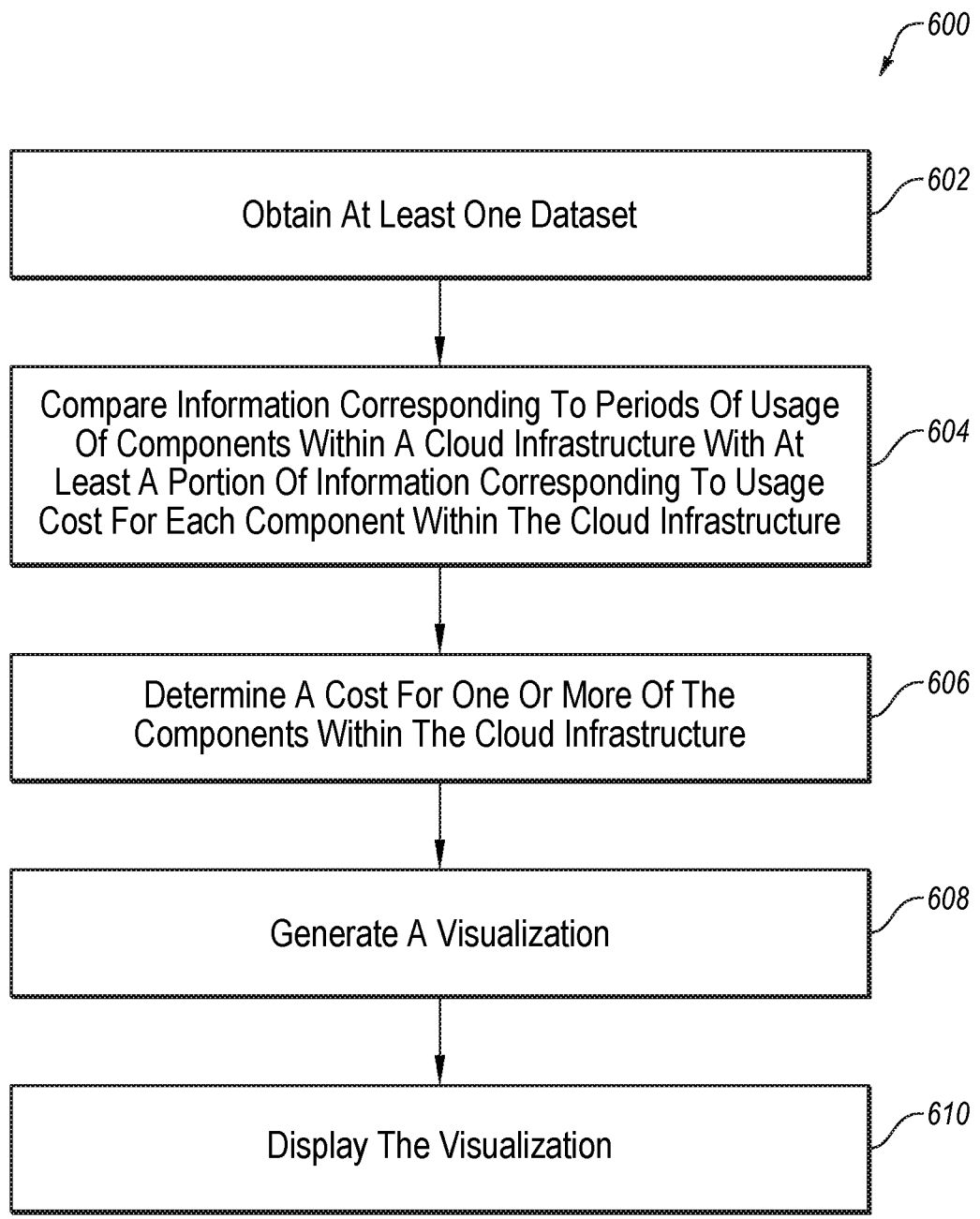
FIG. 6 illustrates a flowchart of a method to generate the visualization of the cost of components within a cloud infrastructure.

FIG. 6 illustrates a flowchart of a method 600 to generate the visualization of the cost of components within the cloud infrastructure, arranged in accordance with at least one embodiment described in the present disclosure. The method 600 may be programmably performed or controlled by a processor in, e.g., a computer and/or server that executes a browser, visualization application, and/or other application to generate the visualization. In an example implementation, the method 600 may be performed in whole or in part by the server 202 and/or the client device 204 of FIG. 2. The method 600 may include one or more of blocks 602, 604, 606, 608, and/or 610. The method 600 may begin at block 602.

At block 602 ("Obtain At Least One Dataset"), at least one dataset may be obtained. In some embodiments, the at least one dataset may include information corresponding to a usage cost for each component within the cloud infrastructure. For example, the at least one dataset may include a list of prices associated with the components within the cloud infrastructure. As another example, the computing device 108 of FIG. 1 may obtain the at least one dataset from the data sources 102, 104, 106 of FIG. 1. In these and other embodiments, the at least one dataset may include information corresponding to one or more periods of usage of the components within the cloud infrastructure. For example, the at least one dataset may include the bill or the estimated rate of component usage. Block 602 may be followed by block 604.

At block 604 ("Compare Information Corresponding To Periods Of Usage Of Components Within A Cloud Infrastructure With At Least A Portion Of Information Corresponding To Usage Cost For Each Component Within The Cloud Infrastructure"), information corresponding to periods of usage of components within a cloud infrastructure may be compared with at least a portion of information corresponding to usage cost for each component within the cloud infrastructure. For example, the list of prices may be compared to the bill or the estimated rate of component usage. Block 604 may be followed by block 606.

At block 606 ("Determine A Cost For One Or More Of The Components Within The Cloud Infrastructure"), a cost for one or more of the components within the cloud infrastructure may be determined. The cost may be determined for each of the components within the cloud infrastructure for the period of time. The cost may be determined based on the comparison of the first dataset (e.g., the information corresponding to the periods of usage of the components within the cloud infrastructure) with at least a portion of the second dataset (e.g., the portion of the information corresponding to the usage cost for each component of the plurality of components within the cloud infrastructure). The cost may either be the estimated usage cost or the actual usage cost of the components for the period of time. Block 606 may be followed by block 608.

At block 608 ("Generate A Visualization") a visualization may be generated. The visualization may include information representative of the cost of one or more of the components within the cloud infrastructure for the period of time. For example, the visualization 126 of FIG. 1 may be generated representative of the cost of the components within the cloud infrastructure. Block 608 may be followed by block 610. At block 610 ("Display The Visualization"), the visualization may be displayed. The visualization may be displayed via a display screen. For example, the visualization may be displayed via the display screen 112 of FIG. 1.

One skilled in the art will appreciate that, for this and other processes and methods disclosed in the present disclosure, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
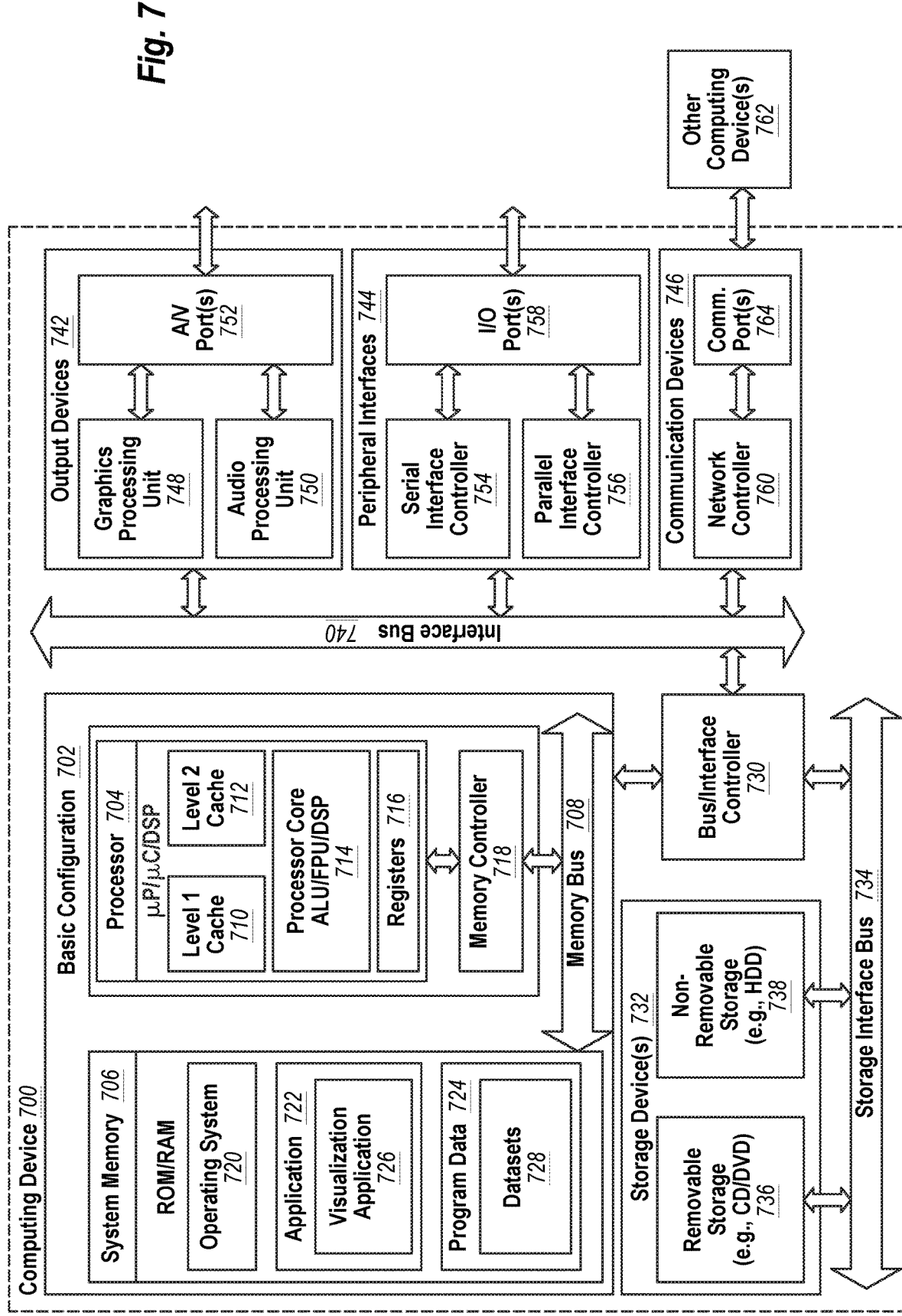
FIG. 7 is a block diagram illustrating an example computing device that is arranged for generating a visualization of the cost of components within the cloud infrastructure, all arranged in accordance with at least one embodiment described in the present disclosure.

FIG. 7 is a block diagram illustrating an example computing device 700 that is arranged for generating a visualization of a cost of components within a cloud infrastructure, arranged in accordance with at least one embodiment described in the present disclosure. In a basic configuration 702, the computing device 700 typically includes one or more processors 704 and a system memory 706. A memory bus 708 may be used to communicate between the processor 704 and the system memory 706.

Depending on the desired configuration, the processor 704 may be of any type including, but not limited to, a microprocessor (μP), a microcontroller (μC), a digital signal processor (DSP), or any combination thereof. The processor 704 may include one or more levels of caching, such as a level one cache 710 and a level two cache 712, a processor core 714, and registers 716. The processor core 714 may include an arithmetic logic unit (ALU), a floating-point unit (FPU), a digital signal processing core (DSP Core), or any combination thereof. An example memory controller 718 may also be used with the processor 704, or in some implementations the memory controller 718 may include an internal part of the processor 704.

Depending on the desired configuration, the system memory 706 may be of any type including volatile memory (such as RAM), nonvolatile memory (such as ROM, flash memory, etc.), or any combination thereof. The system memory 706 may include an operating system 720, one or more applications 722, and program data 724. The application 722 may include a visualization application 726 that is arranged to generate, customize, and/or interact with the visualization of the actual usage cost, as described in the present disclosure. The program data 724 may include dataset 728 (which may include or correspond to the dataset discussed elsewhere in the preset disclosure) as is described in the present disclosure, or other visualization application data. In some embodiments, the application 722 may be arranged to operate with the program data 724 on the operating system 720 such that the method 600 of FIG. 6 may be provided as described in the present disclosure.

The computing device 700 may have additional features or functionality, and additional interfaces to facilitate communications between the basic configuration 702 and any involved devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 706, the removable storage devices 736, and the non-removable storage devices 738 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 700. Any such computer storage media or non-transitory computer-readable media may be part of the computing device 700.

The computing device 700 may also include an interface bus 740 to facilitate communication from various interface devices (e.g., output devices 742, peripheral interfaces 744, and communication devices 746) to the basic configuration 702 via the bus/interface controller 730. The output devices 742 include a graphics processing unit 748 and an audio processing unit 750, which may be configured to communicate to various external devices such as a display or speakers via one or more A/V ports 752. Visualizations generated by the visualization application 726 may be output through the graphics processing unit 748 to such a display. The peripheral interfaces 744 include a serial interface controller 754 or a parallel interface controller 756, which may be configured to communicate with external devices such as input devices (e.g., keyboard, mouse, pen, voice input device, touch input device, etc.), sensors, or other peripheral devices (e.g., printer, scanner, etc.) via one or more I/O ports 758. Such input devices may be operated by a user to provide input to the visualization application 726, which input may be effective to, e.g., alter the visualization of actual usage cost generated by the visualization application 726. The communication devices 746 includes a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used in the present disclosure may include both storage media and communication media.

The computing device 700 may be implemented as a portion of a small-form factor portable (or mobile) electronic device such as a smartphone, a personal data assistant (PDA) or an application-specific device. The computing device 700 may also be implemented as a personal computer including tablet computer, laptop computer, and/or non-laptop computer configurations, or a server computer including both rack-mounted server computer and blade server computer configurations.

Embodiments described in the present disclosure may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed in the present disclosure, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general-purpose hardware), specific hardware implementations or a combination of software and specific hardware implementations are also possible and contemplated. In this description, a "computing entity" may be any computing system as previously defined in the present disclosure, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed in the present disclosure is intended to be dedicated to the public regardless of whether such disclosure is explicitly recited in the above description.

The present disclosure is not to be limited in terms of the particular embodiments described in the present disclosure, which are intended as illustrations of various aspects. Many modifications and variations can be made without departing from its spirit and scope. Functionally equivalent methods and apparatuses within the scope of the disclosure, in addition to those enumerated in the present disclosure, are possible from the foregoing descriptions. Such modifications and variations are intended to fall within the scope of this disclosure. Also, the terminology used in the present disclosure is for the purpose of describing particular embodiments only, and is not intended to be limiting.

With respect to the use of substantially any plural and/or singular terms in the present disclosure, those having skill in the art can translate from the plural to the singular and/or from the singular to the plural as is appropriate to the context and/or application. The various singular/plural permutations may be expressly set forth in the present disclosure for sake of clarity.

In general, terms used in the present disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed in the present disclosure also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed in the present disclosure can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described in the present disclosure for purposes of illustration, and various modifications may be made without departing from the scope and spirit of the present disclosure. Accordingly, the various embodiments disclosed in the present disclosure are not intended to be limiting.

What is claimed is:

1. A method comprising:
   obtaining a first dataset that includes:
      information corresponding to a usage cost for each component of a plurality of components within a cloud infrastructure; and
      metadata corresponding to information describing a functionality of one or more components of the plurality of components within the cloud infrastructure;
   determining an actual usage of the plurality of components during a first period of time within the cloud infrastructure;
   obtaining a second dataset that includes:
      information corresponding to the determined actual usage of the plurality of components during the first period of time within the cloud infrastructure; and
      information corresponding to an estimated usage of the plurality of components during a second period of time within the cloud infrastructure;
   performing a first comparison that includes comparing the information of the second dataset corresponding to the determined actual usage of the plurality of components during the first period of time within the cloud infrastructure with at least a portion of the information of the first dataset corresponding to the usage cost for each component of the plurality of components within the cloud infrastructure;
   performing a second comparison that includes comparing the information of the second dataset corresponding to the determined actual usage of the plurality of components during the first period of time within the cloud infrastructure with at least a portion of the metadata of the first dataset corresponding to information describing the functionality of one or more components of the plurality of components within the cloud infrastructure;
   performing a third comparison that includes comparing the information of the second dataset corresponding to the estimated usage of the plurality of components during the second period of time within the cloud infrastructure with at least the portion of the information of the first dataset corresponding to the usage cost for each component of the plurality of components within the cloud infrastructure;
   determining an overall cost for one or more components of the plurality of components during the first period of time within the cloud infrastructure based on the first comparison;
   determining for what purpose one or more components of the plurality of components during the first period of time within the cloud infrastructure was used for based on the second comparison;
   determining a future cost for one or more components of the plurality of components during the second period of time within the cloud infrastructure based on the third comparison;
   generating a visualization within a graphical user interface (GUI) that comprises:
      a plurality of objects and information representative of the overall cost for one or more components of the plurality of components during the first period of time within the cloud infrastructure;
      the future cost for one or more components of the plurality of components during the second period of time within the cloud infrastructure; and
      for what purpose one or more components of the plurality of components during the first period of time within the cloud infrastructure was used for; and
   displaying, via a display screen, the visualization within the GUI to allow a user to interact with the visualization within the GUI.

2. The method of claim 1, further comprising:
   receiving, via the GUI being displayed via the display screen, a user input effective to indicate at least one object of the plurality of objects is to be altered; and
   altering the visualization within the GUI being displayed via the display screen based on the user input.

3. The method of claim 1, further comprising:
   receiving, via the GUI being displayed via the display screen, a user input effective to select portions of at least one dataset to be included in the visualization within the GUI being displayed via the display screen; and filtering at least a portion of the at least one dataset, wherein the visualization within the GUI being displayed via the display screen is generated to only include costs corresponding to the selected portions of the at least one dataset.

4. The method of claim 1, further comprising:

receiving, via the GUI being displayed via the display screen, a user input effective to select a function to be performed using only information that is included in one or more objects within the visualization within the GUI being displayed via the display screen; and performing the selected function using only the information that is included in the one or more objects within the visualization within the GUI being displayed via the display screen.

5. A non-transitory computer-readable hardware storage medium having computer-executable instructions stored thereon that are executable by a processor device to perform or control performance of operations comprising:

obtaining a first dataset that includes:
information corresponding to a usage cost for each component of a plurality of components within a cloud infrastructure; and
metadata corresponding to information describing a functionality of one or more components of the plurality of components within the cloud infrastructure;

determining an actual usage of the plurality of components during a first period of time within the cloud infrastructure;

obtaining a second dataset that includes:
information corresponding to the determined actual usage of the plurality of components during the first period of time within the cloud infrastructure; and
information corresponding to an estimated usage of the plurality of components during a second period of time within the cloud infrastructure;

performing a first comparison that includes comparing the information of the second dataset corresponding to the determined actual usage of the plurality of components during the first period of time within the cloud infrastructure with at least a portion of the information of the first dataset corresponding to the usage cost for each component of the plurality of components within the cloud infrastructure;

performing a second comparison that includes comparing the information of the second dataset corresponding to the determined actual usage of the plurality of components during the first period of time within the cloud infrastructure with at least a portion of the metadata of the first dataset corresponding to information describing the functionality of one or more components of the plurality of components within the cloud infrastructure;

performing a third comparison that includes comparing the information of the second dataset corresponding to the estimated usage of the plurality of components during the second period of time within the cloud infrastructure with at least the portion of the information of the first dataset corresponding to the usage cost for each component of the plurality of components within the cloud infrastructure;

determining an overall cost for one or more components of the plurality of components during the first period of time within the cloud infrastructure based on the first comparison;

determining for what purpose one or more components of the plurality of components during the first period of time within the cloud infrastructure was used for based on the second comparison;

determining a future cost for one or more components of the plurality of components during the second period of time within the cloud infrastructure based on the third comparison;

generating a visualization within a graphical user interface (GUI) that comprises:
a plurality of objects and information representative of the overall cost for one or more components of the plurality of components during the first period of time within the cloud infrastructure;
the future cost for one or more components of the plurality of components during the second period of time within the cloud infrastructure; and
for what purpose one or more components of the plurality of components during the first period of time within the cloud infrastructure was used for; and displaying, via a display screen, the visualization within the GUI to allow a user to interact with the visualization within the GUI.

6. The non-transitory computer-readable hardware storage medium of claim 5, the operations further comprising:

receiving, via the GUI being displayed via the display screen, a user input effective to indicate at least one object of the plurality of objects is to be altered; and altering the visualization within the GUI being displayed via the display screen based on the user input.

7. The non-transitory computer-readable hardware storage medium of claim 5, the operations further comprising:

receiving, via the GUI being displayed via the display screen, a user input effective to select portions of at least one dataset to be included in the visualization within the GUI being displayed via the display screen; and filtering at least a portion of the at least one dataset, wherein the visualization within the GUI being displayed via the display screen is generated to only include costs corresponding to the selected portions of the at least one dataset.

8. The non-transitory computer-readable hardware storage medium of claim 5, the operations further comprising:

receiving, via the GUI being displayed via the display screen, a user input effective to select a function to be performed using only information that is included in one or more objects within the visualization within the GUI being displayed via the display screen; and performing the selected function using only the information that is included in the one or more objects within the visualization within the GUI being displayed via the display screen.

9. A system comprising:
a processor configured to cause performance of operations comprising:
obtaining a first dataset that includes:
information corresponding to a usage cost for each component of a plurality of components within a cloud infrastructure; and
metadata corresponding to information describing a functionality of one or more components of the plurality of components within the cloud infrastructure;

determining an actual usage of the plurality of components during a first period of time within the cloud infrastructure;
obtaining a second dataset that includes:
  information corresponding to the determined actual usage of the plurality of components during the first period of time within the cloud infrastructure; and
  information corresponding to an estimated usage of the plurality of components during a second period of time within the cloud infrastructure;
performing a first comparison that includes comparing the information of the second dataset corresponding to the determined actual usage of the plurality of components during the first period of time within the cloud infrastructure with at least a portion of the information of the first dataset corresponding to the usage cost for each component of the plurality of components within the cloud infrastructure;
performing a second comparison that includes comparing the information of the second dataset corresponding to the determined actual usage of the plurality of components during the first period of time within the cloud infrastructure with at least a portion of the metadata of the first dataset corresponding to information describing the functionality of one or more components of the plurality of components within the cloud infrastructure;
performing a third comparison that includes comparing the information of the second dataset corresponding to the estimated usage of the plurality of components during the second period of time within the cloud infrastructure with at least the portion of the information of the first dataset corresponding to the usage cost for each component of the plurality of components within the cloud infrastructure;
determining an overall cost for one or more components of the plurality of components during the first period of time within the cloud infrastructure based on the first comparison;
determining for what purpose one or more components of the plurality of components during the first period of time within the cloud infrastructure was used for based on the second comparison;
determining a future cost for one or more components of the plurality of components during the second period of time within the cloud infrastructure based on the third comparison;
generating a visualization within a graphical user interface (GUI) that comprises:
  a plurality of objects and information representative of the overall cost for one or more components of the plurality of components during the first period of time within the cloud infrastructure;
  the future cost for one or more components of the plurality of components during the second period of time within the cloud infrastructure; and
  for what purpose one or more components of the plurality of components during the first period of time within the cloud infrastructure was used for; and
displaying, via a display screen, the visualization within the GUI to allow a user to interact with the visualization within the GUI.

10. The system of claim 9, the operations further comprising:
receiving, via the GUI being displayed via the display screen, a user input effective to indicate at least one object of the plurality of objects is to be altered; and
altering the visualization within the GUI being displayed via the display screen based on the user input.

11. The system of claim 9, the operations further comprising:
receiving, via the GUI being displayed via the display screen, a user input effective to select portions of at least one dataset to be included in the visualization within the GUI being displayed via the display screen; and
filtering at least a portion of the at least one dataset, wherein the visualization within the GUI being displayed via the display screen is generated to only include costs corresponding to the selected portions of the at least one dataset.

* * * * *